United States Patent [19]
Neff

[11] 4,002,146
[45] Jan. 11, 1977

[54] INSECT COLLECTION AND FEEDING

[76] Inventor: Gregor N. Neff, 85 Myrtle Ave., Dobbs Ferry, N.Y. 10522

[22] Filed: Jan. 30, 1975

[21] Appl. No.: 545,514

Related U.S. Application Data

[63] Continuation-in-part of Ser. No. 460,619, April 12, 1974, Pat. No. 3,939,802, which is a continuation-in-part of Ser. No. 213,966, Dec. 30, 1971, abandoned, and a continuation-in-part of Ser. No. 477,839, June 10, 1974, and a continuation-in-part of Ser. No. 497,540, Aug. 14, 1970, Pat. No. 3,951,104.

[52] U.S. Cl. .................................. 119/51 R; 119/3
[51] Int. Cl.² .......................................... A01K 5/00
[58] Field of Search ................. 43/139, 113; 119/3, 119/51 R

[56] References Cited
UNITED STATES PATENTS

| 993,644 | 5/1911 | Brisban | 43/139 |
|---|---|---|---|
| 1,540,518 | 6/1925 | Drugan | 43/139 |
| 2,883,790 | 4/1959 | Blackman | 43/139 X |
| 3,152,420 | 10/1964 | Pawl | 43/139 |

Primary Examiner—Hugh R. Chamblee
Attorney, Agent, or Firm—Curtis, Morris & Safford

[57] ABSTRACT

Insects are collected and fed to aquatic animals such as fish and frogs. In collecting the insects, an ultraviolet lamp for attracting the insects is hidden in a vertical funnel where the insects cannot see the lamp from a horizontal position. However, the lamp is open to view from above. The insects therefore must fly downwardly to reach the lamp. The lamp is positioned near the exit of the funnel, and the exit empties into an enclosed air space above the water containing the aquatic animals to be fed. A fan is located below the lamp to draw air downwardly through the funnel and into the enclosure below. The insects thus are urged into the trap by at least three forces: the force of gravity, inertia of the downwardly-flying insects, and the air drafts created by the fan. The funnel inlet makes a big target for the insects. Light is reflected upwardly by the funnel walls to attract airborne insects. The light also is directed downwardly into the water below to attract aquatic insects and other fauna from the water. Preferably, the aquatic animals being fed are kept in a cage below the insect collector. The animals, e.g. fish, eat the insects and fauna coming from above and below.

11 Claims, 4 Drawing Figures

U.S. Patent
Jan. 11, 1977
4,002,146
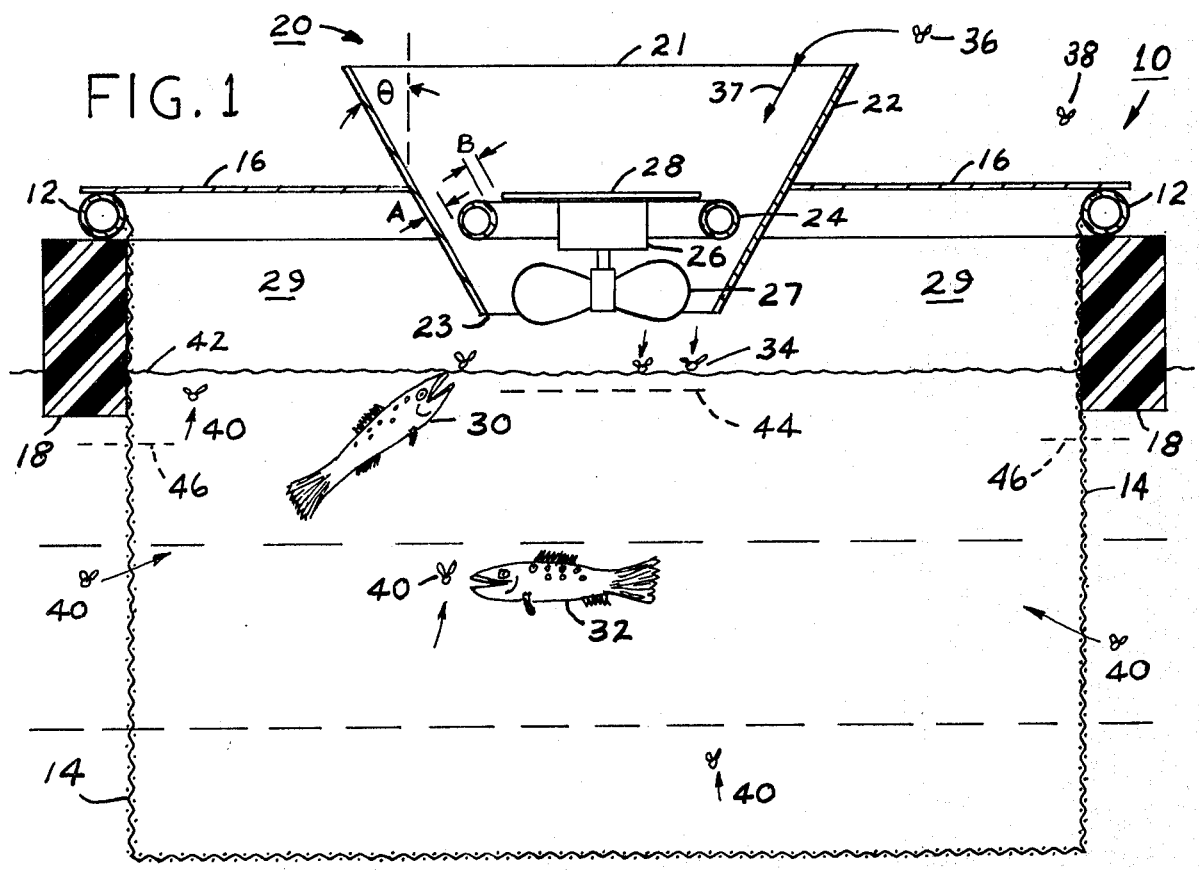
FIG. 1
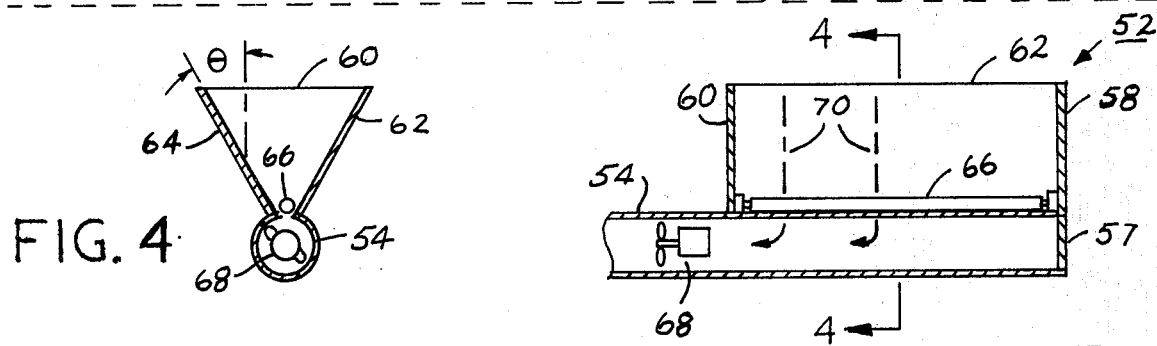
FIG. 4
FIG. 3
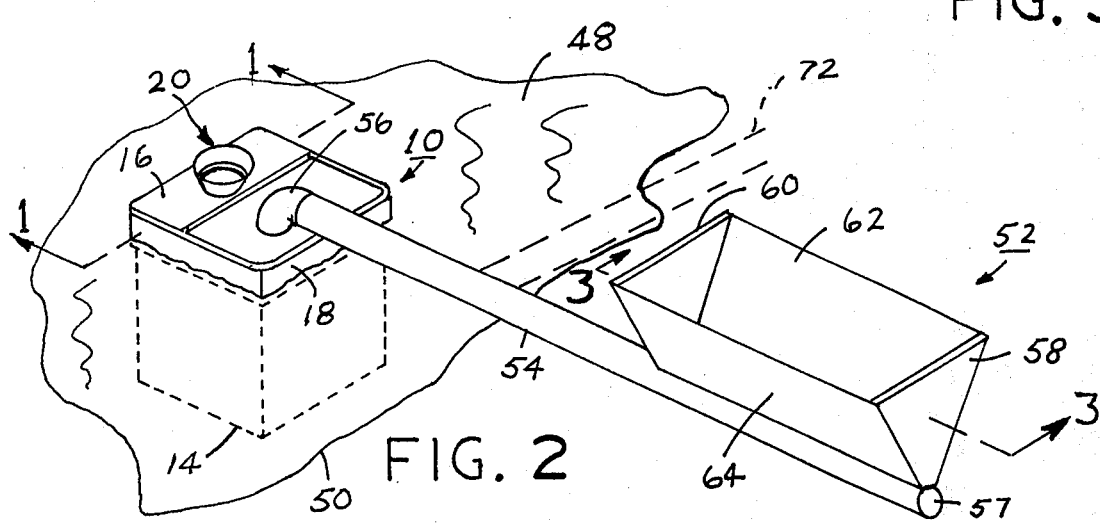
FIG. 2

INSECT COLLECTION AND FEEDING

This invention relates to aquatic animal feeding and insect collection. This patent application is a continuation-in-part of the following U.S. patent applications: Ser. No. 460,619 filed Apr. 12, 1974, now U.S. Pat. No. 3,939,802, which is a continuation-in-part of Ser. No. 213,966, filed Dec. 30, 1971 (now abandoned); Ser. No. 477,839 filed June 10, 1974; and Ser. No. 497,540, filed Aug. 14, 1974, now U.S. Pat. No. 3,951,104. The disclosure of each of said applications is hereby incorporated herein by reference.

It is an object of this invention to significantly reduce the cost and labor required in feeding animals by collecting and feeding them insects. The insects cost nothing and can be collected without much labor. It also is an object to provide improved insect collection devices and methods for use in feeding aquatic animals.

The above objects are met by providing means for collecting and holding airborne and aquatic insects near the surface of water containing the aquatic animals until the insects are eaten. Also, light is shined into the water to attract aquatic insects from within the water. The insect collector uses light, preferably "near" ultraviolet (3,000 to 4,000 A) to attract the insects downwardly into a housing in which the lamp emitting the light is hidden so that it cannot be seen from a horizontal direction by the airborne insects. Preferably, a fan also creates air currents drawing the insects downwardly towards the water. Thus, the insects are forced towards the trap by at least two forces; inertia, and gravity, and preferably by a third, the force of the air flow created by the fan.

Other objects and advantages will be set forth in or apparent from the following description and drawings.

In the drawings:

FIG. 1 is a cross-sectional view, taken along line 1—1 of FIG. 2, of the preferred embodiment of the invention;

FIG. 2 is a perspective view of another embodiment of the invention, together with the embodiment of FIG. 1;

FIGS. 3 and 4 are cross-sectional views taken along lines 3—3 and 4—4 of FIGS. 2 and 3, respectively.

FIG. 1 shows a floating cage for use in growing fish 30 and 32. The cage 10 includes a tubular frame 12, an enclosure 14 made of netting material secured to the frame 12, a cover 16, and a floating ring 18 extending completely around the cage 10 and supporting the frame 12 above the surface 42 of the water in which the cage floats.

An insect collector device 20 is mounted in a hole in the cover 16. The collector 20 includes a frustro-conically shaped housing 22, a toroidally-shaped lamp 24, and a fan consisting of an electric motor 26, and a fan blade 27 driven by the motor. The motor 26 is mounted on a baffle plate 28 located in the center of the toroidal lamp 24.

The lamp 24 is a fluorescent "black light" which produces predominately near ultra-violet radiation; that is, radiation of from 3,000 to 4,000 angstroms, preferably with a peak near 3,600 angstroms. This type of radiation is known to attract insects very strongly, and has been found to penetrate water well. The fan blade 27 is rotated so as to create a down-draft of air through the housing 22 and downwardly into the cage 10 through the exit opening 23 of the housing. The radiation (including some visible light) from the lamp 24 shines into the water below, and simultaneously is reflected upwardly by the walls of the housing 22, which preferably are made of reflective metal such as aluminum for this purpose. The radiation penetrating into the water attracts aquatic insects 40 and other fauna such as plankton and small shrimp from within the water towards the lamp. The lamp also attracts flying insects such as insects 36 and 38 towards it.

The lamp 24 is hidden deep within the opaque housing so that it is not visible to insects 38 which are flying below the upper edge 21 of the housing. The insects must fly over the edge of the housing and down into the housing along paths such as path 37 in order to reach the lamp 24. Thus, the flying insects are drawn into the trap by three forces acting simultaneously; first, by the force of gravity, which pulls the insects downwardly towards the lamp 24; secondly, by the force of inertia, which prevents the downwardly-flying insects from escaping; and thirdly by the force of the air drafts created by the fan. With each of these three forces operating to trap the insects, the trap is extremely effective in gathering flying insects to be fed to the aquatic animals.

Although it might seem to be detrimental to hide the lamp 24 from horizontal view by the insects, the opposite has been found to be true; the collector 20 has a greater collection efficiency because of this feature. In fact, the collector 20 has utility as an insect trap to rid habitated areas of flying insect pests. In such a use, a collection bag or bath (represented by the water in FIG. 1) can be attached at the outlet 23 to collect the insect.

The air drafts created by the fan preferably are given a relatively high velocity by mounting the lamp bulb 24 with its outside a relatively short distance "A" from the side walls of the housing 22, and with its inner surface a relatively short distance "B" from the outer edge of the baffle plate 28. This arrangemment produces downwardly-directed air drafts of relatively high velocity around both the inside and the outside of the bulb 24. The baffle plate 28 covers and partially protects the motor 26 and fan blades 27 from rain and exposure to the sun.

Electrical wires and ballast for the motor 26 and the lamp 24, as well as mounting details of the device 20, have been omitted from the drawings for the sake of clarity. However, it is preferred that the plate 28, lamp 24, ballast and connecting structure be easily removable as a unit from the housing 22 for maintenance.

The air space 29 formed by the upper portion of the cage in cooperation with the upper surface of the water 42 is fully enclosed so that insects trapped in the air space cannot easily escape. The flying insects which enter the enclosure are forced eventually onto the water where they can be eaten by the fish 30 and 32. The enclosed air space 29 also traps aquatic insects emerging from the surface 42 of the water which have escaped being eaten by the fish in the cage. These insects also eventually fall to the water or are driven into the water by the fan so that they are eaten by the fish.

FIG. 1 also shows a structure for feeding fish not confined in a cage. The cage portion 14 is removed by cutting it away, for example, along the dashed lines 46; preferably the cage is omitted entirely. The remaining structure is floated on the surface of a pond containing the aquatic animals to be fed. The fish are drawn towards the lamp 24 by its light and feed on the flying and aquatic insects collected under the lamp.

FIG. 1 also shows a partially submerged platform 44 which can be used to support amphibians (e.g. frogs), partially submerged in the water where they can feed on insects which are blown down through the collector 20 or emerge from the water.

A lamp 24 which has been used successfully is a No. FC12T10BL circular fluorescent blacklight bulb made by the General Electric Company, New York, New York, U.S.A. It is approximately 12 inches (30 cm.) in outside diameter and 1¼ inches (3.2 cm.) in tube diameter. The motor 26 rotates at 1500 revolutions per minute or faster. The blade 27 is a screw-type, two bladed structure with an outside diameter of approximately 8 inches (20 cm.). The housing preferably is about 12 inches (30 cm.) high, and the lamp 24 is located around 8 inches (20 cm.) from the top 21 of the housing. The fan blade 27 preferably is just inside or slightly below the outlet opening 23 of the housing.

The angle of inclination $\theta$ of the sides of the housing 22 preferably is around 30°, but can vary between 0° and 45°. The larger the angle $\theta$ the wider the opening at the top 21 of the housing and the larger will be the target for the insects to hit. However, the air drafts are stronger with smaller angles.

The bulb 24 preferably is positioned as close to the surface of the water as possible without creating interference between the fan and the water. The reason for this is that it is desired to maximize the amount of radiation entering the water to attract larger quantities of insects and fauna from within the water.

The upper surface of the bulb 24 is fully exposed to view from above so as to maximize the attraction to flying insects. The length of the housing extending below the lamp 24 preferably is minimized in order to make the light reaching the water a maximum without interfering with the creation of air drafts over the bulb by the fan.

The close spacing of the bulb 24 from the housing 22 and the baffle plate 28 also is useful in preventing predators such as birds and snakes from entering the cage to devour the fish.

The cage 10 can be any of a number of known types, but preferably is a cage made of corrosion-resistant materials such as the "Double-Q" brand cage sold by Inqua Corporation, 18460 S.W. 295th Terrace, Homestead, Florida, U.S.A., which is shown in the U.S. patent application filed on Jan. 29, 1975 and entitled "Aquatic Animal Cage and Fabrication Method". The disclosure of that application is incorporated herein by reference.

In feeding fish, the effectiveness of the invention appears to be greatest during the seasons (the spring in temperate climates) when the largest numbers of aquatic insects hatch. During those seasons, large numbers of insects are attracted from within the water, as well as from the air. During such periods, it may be unnecessary to feed the fish or other animals anything other than the insects. However, at other times, when the insects are not as plentiful, it may be necessary to supply supplemental food to the fish. If so, feed can easily be thrown into the funnel-shaped housing 22.

FIG. 2 shows the cage 10 of FIG. 1 floating in a body 48 of water with a shoreline 50. On the shore is located a supplemental feeding device 52 whose construction is shown in detail in FIGS. 3 and 4. The feeding device 52 utilizes a linear blacklight bulb 66 instead of a toroidal bulb. The lamp 66 is located at the bottom of a hopper formed by end walls 58 and 60, and sloping side walls 62 and 64, which are made of reflective material such as aluminum or another metal.

As it is shown in FIG. 4, there is a small gap between the lower edges of the sides 62 and 64 immediately below the lamp 66. Through this gap insects are drawn by a fan 68 which pulls air downwardly along lines 70 (FIG. 3). The fan 68 then blows the insects through a pipe 54 (FIG. 2) and an elbow 56 through a hole in the top of the cage 10 to deposit the insects in the cage to be eaten by the aquatic animals.

The angle $\Theta$ (FIG. 4) is the same as the angle $\Theta$ shown in FIG. 1. The insects are attracted and urged into the trap 52 by the same three forces operating to trap insects in the device 20 shown in FIG. 1. Thus, superior results also are obtained with the device shown in FIGS. 3 and 4. However, the air currents appear to be stronger in the device shown in FIG. 1, probably because of the circular shape of the housing 22 and the air drafts created by the fan 27.

If desired, additional auxiliary insect collectors 52 or 20 can be mounted on land and attached by means of auxiliary pipes such as the pipe 72 shown in dashed outline in FIG. 2 to feed insects into the cage 10. Thus, auxiliary feeders on land can be connected in series and in parallel to supply insects to the cage 10.

If desired, the insect collector of the present invention can be used to collect and supply insects to feed animals other than aquatic animals. For example, in areas where substantial quantities of insects are available, they can be collected and made into feed for chicken, cattle, and hogs. The protein content for the insects is relatively high and their nutritional value is good.

Ultraviolet lamps of a shape other than toroidal or linear can be used. For example, a substantially spherical bulb can be used. Such bulbs usually are incandescent, however, and should be protected from rain or splashed water so that they will not break because of their high temperatures. Fluorescent bulbs are preferred because of their lower power consumption (greater efficiency) and lower temperatures.

If electric power is not available in the vicinity in which the invention is to be used, the lamp and fan shown in FIG. 1 can be replaced by a fossil fuel lamp such as an oil lamp. The lamp is placed well down into the housing 22 so that its light shines into the water and upwardly also. The insects then are trapped by the combination of the forces of inertia and gravity and, despite the absence of a fan, cannot easily escape from the air space 29 because of the restricted passageways between the lamp and the housing 22.

Most aquatic animals will feed on insects. Thus, the invention is useful for raising a wide variety of fish and amphibians. For example, fish species as diverse as trout, carp and catfish can be raised by use of the invention. The cost of raising the animals is reduced because the insects cost nothing, and the collecting equipment and energy to operate it are not very expensive. The invention efficiently converts insects, which often are pests, into food edible by human beings.

The device shown in FIG. 1 unexpectedly solved problems which occurred with previous insect collectors used for the same purpose and shown in my above-identified prior patent applications. That problem was that large piles of dead insects collected around the trap on top of the cage and did not reach the fish where they could be eaten. The present invention has substantially solved this problem by providing a relatively large space for the insects to enter, and by ensuring that the only surfaces illuminated by the lamp 24 were those on the inside of the housing 22, as well as trapping the insects more certainly. Thus, any insect attracted toward that surface would be deflected from the sides of the housing downwardly toward the lamp and the nearby exit 23.

Means other than the enclosure 29 for preventing the escape of the insects from the vicinity of the water can be provided. For example, the insect collector or trap 20 and the enclosure 29 can be replaced by an electrocution type of insect trap which electrocutes the insects so that they fall dead or stunned onto the water surface 42. Means for chopping the insects caught in the trap 20 is another alternative way of incapacitating the insects.

The above description of the invention is intended to be illustrative and not limiting. Various changes or modifications in the embodiments described may occur to those skilled in the art and these can be made without departing from the spirit or scope of the invention.

I claim:

1. A device for feeding aquatic animals, said device comprising means for restraining insects adjacent a body of water containing said aquatic animals, an insect collector operatively connected to said restraining means and having an upwardly facing entrance and a downwardly facing exit opening, an insect attractor mounted substantially entirely within said collector near said exit opening, said exit opening being directed to said restraining means, and said restraining means comprising means for forming an insect enclosure over said body of water, the walls of said collector being substantially opaque, said attractor being a lamp which is hidden from horizontal view, and means connected to said enclosure for positioning said collector with said exit opening directed into said enclosure.

2. A device as in claim 1 in which said collector has converging side walls joining said entrance and exit opening, said exit opening having a cross-sectional area substantially smaller than that of said entrance, and including means for creating an air stream through said collector and out of said exit opening.

3. A device as in claim 2 in which said collector is funnel-shaped and said attractor is a round lamp located near said exit opening, and means for limiting the space between the lamp and the side walls of the funnel to relatively small dimensions, whereby relatively strong air drafts flow through said space.

4. A device as in claim 3 in which said lamp is toroidal and is located in a substantially horizontal plane, said fan means being a circular fan located below said lamp to draw air downwardly through said collector.

5. A device as in claim 1 in which the collector is frustro-conically shaped, said lamp is a toroidal blacklamp, and including means for mounting said lamp at a position above said exit and close to said collector, a baffle mounted in the center of and close to said lamp, and a fan mounted on and extending downwardly from said baffle, the internal surface of said housing being reflective to ultra-violet light.

6. A device as in claim 1 in which said enclosure forming means is adapted to float on the water, and the surface of said water forms the bottom of said enclosure, including a cage in said water underneath said enclosure for containing said animals, and including means for mounting said collector with said lamp shining directly into said water below said device.

7. An insect trap for use in feeding aquatic animals including means for forming an insect enclosure for restraining insects adjacent the surface of a body of water, said means including a float for supporting the enclosure on the water, a substantially opaque collector housing operatively connected to said enclosure and communicating therewith, said housing having an entrance opening and an exit opening, an insect attractor lamp mounted substantially entirely within said collector housing near said exit opening and a substantial distance downstream from said entrance opening, means for supporting said collector housing with respect to said enclosure in a position in which said entrance opening is at a substantially higher elevation than said exit opening, said lamp being positioned in said housing to be hidden from horizontal view but visible from above said lamp through said entrance opening and fan means in said collector downstream of said lamp for urging insects downwardly from said lamp into said enclosure.

8. A trap as as in claim 7 in which said housing includes converging side walls joining said entrance and exit openings, said exit opening having a cross-sectional area substantially smaller than that of said entrance opening, said band means creating an air stream through said collector housing and out of said exit opening, said attractor lamp comprising an ultraviolet lamp, and the internal surface of said side walls being reflective to ultraviolet light.

9. A trap as in claim 7 in which said housing is trough-shaped and said attractor is a linear ultraviolet lamp near said exit opening.

10. A method of feeding insects to aquatic animals in a body of water, said method comprising the step of supporting an insect enclosure on said body of water for restraining insects adjacent the body of water, supporting an insect attracting lamp in a predetermined position with respect to said enclosure and adjacent the surface of said body of water inhabited by said animals, hiding said lamp from horizontal view by enclosing said lamp in a substantially opaque housing which is open at the top and bottom and which is in communication with said enclosure, shining light from said lamp downwardly into said water and upwardly through the open top of the housing to attract insects from above and below said lamp, causing insects to travel a substantial distance downwardly in said housing by locating said lamp a substantial distance below the open top of said housing, and urging towards said water, into said enclosure, insects which are attracted to said lamp by creating an air stream in the housing running from the top to the bottom thereof with the aid of a fan located in the housing below the lamp.

11. An aquatic animal feeding method comprising, the step of, hiding an insect attractor, comprising a lamp which emits ultraviolet light, from horizontal view while opening it to view from above, guiding said insects towards water containing said aquatic animals, preventing said insects from escaping from the vicinity of the surface of said water, reflecting said light upwardly and drawing air downwardly past said lamp, directing light from said lamp towards said water; said step of preventing insects from escaping including the step of forming a first enclosure to hold said insects over the water; and holding aquatic animals in an enclosure in communication with the first enclosure for receiving said insects to be eaten.

* * * * *